UNITED STATES PATENT OFFICE.

FRIEDRICH UHDE, OF GERTHE, GERMANY.

PRODUCTION OF AMMONIUM NITRATE FROM AMMONIACAL GASES.

1,053,456.   Specification of Letters Patent.   Patented Feb. 18, 1913.

No Drawing.   Application filed December 18, 1911.   Serial No. 666,620.

*To all whom it may concern:*

Be it known that I, FRIEDRICH UHDE, a subject of the German Emperor, residing at Gerthe, Westphalia, Germany, have invented certain new and useful Improvements in the Production of Ammonium Nitrate from Ammoniacal Gases; and I do hereby declare that the following is a full and exact description thereof.

This invention relates to the extraction of ammonia from industrial gases, especially from the distillation gases of coke ovens or gas plants. However the invention may also be applied to gases of other origin, for instance to the ammoniacal gases which may be distilled off from the so-called gas water or from other impure ammoniacal solutions.

The invention consists broadly in introducing the said gases as hot as possible into a watery solution of an alkali earth nitrate after separating from the hot gases the tar eventually contained therein. Besides ammonia these gases contain considerable quantities of carbon dioxid and sulfureted hydrogen and therefore react under the above named conditions for example with a solution of calcium nitrate according to the following equation:

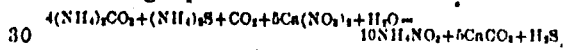

The resulting insoluble calcium carbonate is precipitated and may be filtered off. The filtrate contains dissolved almost pure ammonium nitrate which may be easily obtained by evaporating the solution.

I am aware that it has been previously proposed to absorb gases from coal distillation in earth alkali nitrate solutions and to separate in this manner the ammonia contained in the gases in the form of ammonium nitrate. But as prior inventors have cooled down the gases far below the boiling-point of water in order to permit the tar and the water to be separated from the gases, the conditions were such that the impurities which are always contained in industrial gases, particularly compounds of sulfur and cyanogen, and other compounds, almost undeterminable by chemical analysis were either as such absorbed by the absorbing cold solution or caused the formation of other impurities in said solution.

According to my present invention the tar only, but not the water vapor, is separated from the hot gases, and the gases are conducted into the earth alkali nitrate solution while having such a temperature that the solution acquires a temperature of approximately 100° C. In continuing my process in the above described manner I succeed in obtaining an ammonium nitrate of excellent purity suitable for instance for the production of explosives for which the product obtained by the above-mentioned known process is by no means serviceable without special rectification.

Because of the high temperature of the gases and of the absorbing solution the sulfureted hydrogen which heretofore caused contamination of the solution is not absorbed. I believe that it is partly for the same reason that the other known or unknown impurities of the gases either pass through the solution unabsorbed or are temporarily absorbed and then immediately re-expelled.

A further advantage of my process consists in that the apparatus and materials for cooling and drying the gases are dispensed with. Nevertheless, a more concentrated and therefore more profitable solution is obtained than by the known process. Furthermore, by not separating the water from the gases and not considerably reducing the temperature of the gases I avoid the withdrawal of a considerable quantity of ammonia from the gases, as it is the case in the known process, that is to say, in my process the gases are not diluted with regard to the ammonia, and therefore I need no apparatus for distilling off the ammonia from the ammoniacal water.

In contradistinction to the known methods my process is suitable for absorbing diluted as well as highly concentrated gases. Especially, I may employ it for separating the ammonia contained in the so-called gas-water.

It is true that the product obtained by the above-indicated process according to my invention is far purer than the product obtained by the known process, but sometimes it may nevertheless contain traces of impurities. In this case the product is hygroscopic and slowly assumes a gray or brown color and a prickling smell. In order to eliminate these impurities and to obtain a product quite equivalent to that obtained from pure chemicals I may modify my process in the following manner: After the absorption of the gases by the earth alkali nitrate solution has been terminated and the solution has been filtered off from the precipitate of the calcium or other carbonate, I slightly acidify the filtrate and then I heat the same until a slight development of gas occurs. As acid preferably nitric acid is employed. In this manner cyanogen and other compounds are expelled and by evaporating the solution, I directly obtain on an industrial scale a substantially chemically pure product.

The following specific example shows in what manner my process may be performed: 3 liters of a solution containing 50% of calcium nitrate are placed into a so-called Woolf bottle, holding 10 liters. In this solution I conduct the gas from an ammonia-distilling plant. The gas may for instance contain by weight: $NH_3$ 15%, $CO_2$ 13%, $H_2S$ 5%, $H_2O$ 65.5%. Its pressure may be approximately 1.2 meters of water and its average temperature may be about 95° C. It may be distilled off from common gas-water containing 1% of ammonia. The absorption takes place rapidly until the solution is perfectly saturated. The temperature of the solution rises within a short time from 20 to about 95° C. The reaction is finished in about 25 minutes. The saturated solution the volume of which remains practically unchanged is filtered off from the precipitate while still hot, slightly acidulated and heated. A reaction with slight development of gases takes place. By evaporating the solution thus obtained a white, inodorous and barely hygroscopic product is obtained. The properties of the product do not alter when it is kept in stock for a long time, in contradistinction to the properties of the known technical product. Only very small traces of calcium nitrate, usually not more than 0.03% are found in my product.

I claim:—

1. The process of producing ammonium nitrate from ammoniacal gases substantially free from tar which comprises absorbing such gases having a temperature of approximately 100° C. by a solution of an earth alkali nitrate, so that the temperature of the solution during the greater part of the absorption approximates 100° C., whereafter the solution is filtered off and evaporated, substantially as described.

2. The process of producing ammonium nitrate from coal-distillation gases, which process comprises separating the tar only but not the water vapor from the hot gases, conducting the gases into an earth alkali nitrate solution the temperature of the gases being such that the solution obtains a temperature of approximately 100° C., filtering off and evaporating the solution, substantially as described.

3. The process of producing ammonium nitrate from ammoniacal gases substantially free from tar, which process comprises absorbing such gases while having a temperature of approximately 100° C. by a solution of an earth alkali nitrate so that the temperature of the solution during the greater part of the absorption approximates 100° C., whereafter the solution is filtered off, slightly acidulated and evaporated, substantially as described.

4. The process of producing ammonium nitrate from coal-distillation gases, which process comprises separating from the gases, while still hot, the tar only but not the water vapor, conducting the gases into an earth alkali nitrate solution the temperature of the gases being such that the solution obtains a temperature of approximately 100° C., filtering off, slightly acidulating and evaporating the solution, substantially as described.

5. The process of producing ammonium nitrate from ammoniacal gases substantially free from tar which comprises absorbing such gases in a heated condition by a hot solution of an earth alkali nitrate, filtering the resulting solution, and evaporating the same substantially as described.

In testimony whereof I affix my signature in presence of two witnesses.

FRIEDRICH UHDE.

Witnesses:
 Louis Vandory,
 Therese Thromberend.